United States Patent
Bjork et al.

(10) Patent No.: US 9,098,555 B2
(45) Date of Patent: Aug. 4, 2015

(54) METHOD AND SYSTEM FOR HEALTH SCORING INFORMATION SYSTEMS, USERS, AND UPDATES

(75) Inventors: Roger Bjork, Round Rock, TX (US); Rajveer Singh Kushwaha, Austin, TX (US); Timothy Abels, Beaverton, OR (US); Stephen Francis Schuckenbrock, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 632 days.

(21) Appl. No.: 12/277,848

(22) Filed: Nov. 25, 2008

(65) Prior Publication Data

US 2010/0131473 A1     May 27, 2010

(51) Int. Cl.
*G06F 11/30* (2006.01)

(52) U.S. Cl.
CPC ........ *G06F 11/3055* (2013.01); *G06F 11/3006* (2013.01); *G06F 11/3089* (2013.01)

(58) Field of Classification Search
CPC ............ H04L 43/0823; H04L 43/0829; H04L 43/0847; G06F 2201/00; G06F 2201/80; G06F 11/008; G06F 11/3051; G06F 11/3055; G06F 11/3006; G06F 11/3089
USPC ................. 714/47.1, 47.2, 47.3, 57
See application file for complete search history.

(56) References Cited

U.S. PATENT DOCUMENTS

| | | | |
|---|---|---|---|
| 5,819,028 A * | 10/1998 | Manghirmalani et al. ...... | 714/57 |
| 6,456,306 B1 * | 9/2002 | Chin et al. .................... | 715/810 |
| 6,691,249 B1 * | 2/2004 | Barford et al. ................. | 714/25 |
| 6,738,811 B1 * | 5/2004 | Liang ............................ | 709/224 |
| 7,003,564 B2 * | 2/2006 | Greuel et al. ................. | 709/224 |
| 7,099,942 B1 * | 8/2006 | Wilson et al. ................. | 709/224 |
| 7,120,678 B2 | 10/2006 | Greuel | |
| 7,539,907 B1 * | 5/2009 | Johnsen et al. .............. | 714/47.2 |
| 7,933,743 B2 * | 4/2011 | Golani et al. ................. | 702/183 |
| 8,189,484 B2 * | 5/2012 | Reich, Jr. ...................... | 370/241 |
| 8,352,216 B2 * | 1/2013 | Subbu et al. .................. | 702/181 |
| 2002/0116151 A1 | 8/2002 | Brown et al. | |
| 2002/0133584 A1 * | 9/2002 | Greuel et al. ................. | 709/224 |
| 2002/0161861 A1 * | 10/2002 | Greuel .......................... | 709/220 |
| 2004/0039958 A1 * | 2/2004 | Maxwell .......................... | 714/4 |
| 2005/0005202 A1 * | 1/2005 | Burt et al. ...................... | 714/47 |
| 2008/0172420 A1 | 7/2008 | Konik | |
| 2008/0263401 A1 | 10/2008 | Stenzel | |
| 2008/0294946 A1 * | 11/2008 | Agarwal et al. ................. | 714/57 |
| 2010/0011254 A1 * | 1/2010 | Votta et al. ...................... | 714/47 |
| 2010/0023350 A1 | 1/2010 | Simms | |

OTHER PUBLICATIONS

SNMP FAQ by CERT Published Feb. 12, 2002 http://www.cert.org/historical/tech_tips/snmp_faq.cfm.*

* cited by examiner

*Primary Examiner* — Joseph Schell
(74) *Attorney, Agent, or Firm* — Terrile, Cannatti, Chambers & Holland, LLP; Stephen A. Terrile

(57) ABSTRACT

A method and system is disclosed for monitoring the status of a system by providing a health score. A health scoring module accesses a configuration management database (CMDB) comprising a plurality of configuration items referencing physical, service and process information. A target value for each configuration item is decided, followed by collecting their current value. Comparison operations are then performed between each configuration item's current and target value and a health subscore is generated. The resulting health subscore is then indexed to its corresponding configuration item. Once indexed, a health score is generated from a predetermined plurality of health subscores.

4 Claims, 11 Drawing Sheets

| Base 410 | Asset Discovery 412 | Asset Mgmt. 414 | Software Distribution 416 | SW Lic. Mgmt. 418 | Patch Mgmt. 420 | Malware Mgmt. 422 | Online Backup 424 | Remote Support 426 | Remote Access 428 | Data Encryption 430 | Connector APIs 432 |
|---|---|---|---|---|---|---|---|---|---|---|---|
| HW Inventory | Agentless HW Inventory | HW Changes | Package Creation | Enhanced SW Inventory | Patch Policies | OS Firewall Reporting | Internet Based | Not Integrated | Integrated | Internet Based | Service Desk |
| Site Creation | IP Device Discovery | HW Reports | Intelligent Package Distribution | SW Purchase Information | Automatic Patching | OS Firewall Config. | Electronic Distribution | Technician Based | Device Based | Electronic Distribution | Service Offering |
| Bandwidth Policies | Agentless SW Inventory | LAN Based Remote Control | Distribution Monitoring | SW Usage | Directed Multi-Patching | Initiate Virus Scan | Usage Reporting | Web Remote Control | Web Remote Control | Config. Mgmt. | SLA |
| Send Message to Device | Agentless Patch Inventory | HW Inventory Search | End User Portal | SW Changes | Uninstall Patches | Virus Detection | End User Self Service | End-User Initiated | End-User Auto Accept | Integrated | Billing |
| User Mgmt. | | Basic Inventory Search | | SW Reports | Patch OS | Monitor Definition Files | Remote Initiation of Backup | Remote Reboot/ Reconnect | Session Tracking | | Reports |
| Advanced Search | | Active Directory Sync | | SW Inventory Search | Patch Office | Force Definition Files | Config. Mgmt. | Screen/ Keyboard Lock | Remote Reboot/ Reconnect | | Analytics |
| Dash-boards | | Device Purchase Information | | SW License Reports | Patch Apps. | CE Supported | | Session Recording | Screen/ Keyboard Lock | | Views |

406 Plug-In Base

*Figure 4a*

| Base 410 | Asset Discovery 412 | Asset Mgmt. 414 | Software Distribution 416 | SW Lic. Mgmt. 418 | Patch Mgmt. 420 | Malware Mgmt. 422 | Online Backup 424 | Remote Support 426 | Remote Access 428 | Data Encryption 430 | Connector APIs 432 |
|---|---|---|---|---|---|---|---|---|---|---|---|
| Data Export | | Site Resolver | | SW License Discovery | AU Mgmt. | Virus Scan Supported | | | Session Recording | | Browser |
| Remote Deployment | | | | Remote SW Uninstall | | SAV Firewall Mgmt. | | | Electronic Distribution | | CRM |
| Web Services | | | | | | Firewall Mgmt. | | | | | CMDB |
| Alerts and Notifications | | | | | | | | | | | SD |
| Localization | | | | | | | | | | | RE |
| | | | | | | | | | | | Ticket/ Orch |
| | | | | | | | | | | | DW |
| | | | | | | | | | | | SQL |

406 Plug-In Base

*Figure 4b*

METHOD AND SYSTEM FOR HEALTH SCORING INFORMATION SYSTEMS, USERS, AND UPDATES

BACKGROUND OF THE INVENTION

1. Field of the Invention

Embodiments of the invention relate generally to information handling systems. More specifically, embodiments of the invention provide a method and system for monitoring the status of a system by providing a health score.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years it has become common for mature industries to use a "health" score as a means of representing various aspects of their facilities, operations, personnel, or clientele. As an example, the financial services industry uses Fair Isaac Corporation (FICO) scores of 1 to 800 to rank the health of a consumer's credit rating.

Components of information technology (IT) environments such as servers, printers, controllers, peripherals, and other devices have exposed manageability and services which embody operating health characteristics. Other IT components, including software applications, workflows, service level agreements, business processes, and user resources have similar characteristics. However, there is currently no corresponding health scoring for these components, individually or collectively. In view of the foregoing, there is a need for health scoring of IT environments, whether they be a subset of the environment, or in whole.

SUMMARY OF THE INVENTION

In accordance with the present invention, the invention relates to a method and system for monitoring the status of a system by providing a health score. In various embodiments, a health scoring module is initiated, which then accesses a configuration management database (CMDB) comprising a plurality of configuration items. Configuration items reference physical, service and process information for an information technology (IT) environment, which allows its operation and status to be more easily understood and diagnosed.

A CMDB not only tracks and records configuration items for an IT environment, but also their corresponding attributes and relationships with other configuration items. As such, a CMDB may contain information that relates to the maintenance, movement, and problems experienced with the configuration items of an IT environment. Information held by a CMDB may range from hardware information, software information, documentation information, personnel information, and/or a variety of other information.

In these and other embodiments, a target value for a group of configuration items is determined. The current value of each of the configuration items is then collected. In various embodiments, a configuration item has a physical, service or business dependency which is factored into its current value during the collection process. Comparison operations are then performed between each configuration item's current and target value and a health subscore is generated. The resulting health subscore is then indexed to its corresponding configuration item. Once indexed, an overall health score is generated from the sum of the health subscores indexed to the group of configuration items. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a-b, referred to herein collectively as FIG. 4, are a simplified block diagram of a plug-in module of a service delivery platform as implemented in accordance with an embodiment of the invention;

DETAILED DESCRIPTION

A method and system are disclosed for monitoring the status of an information handling system by providing a health score. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
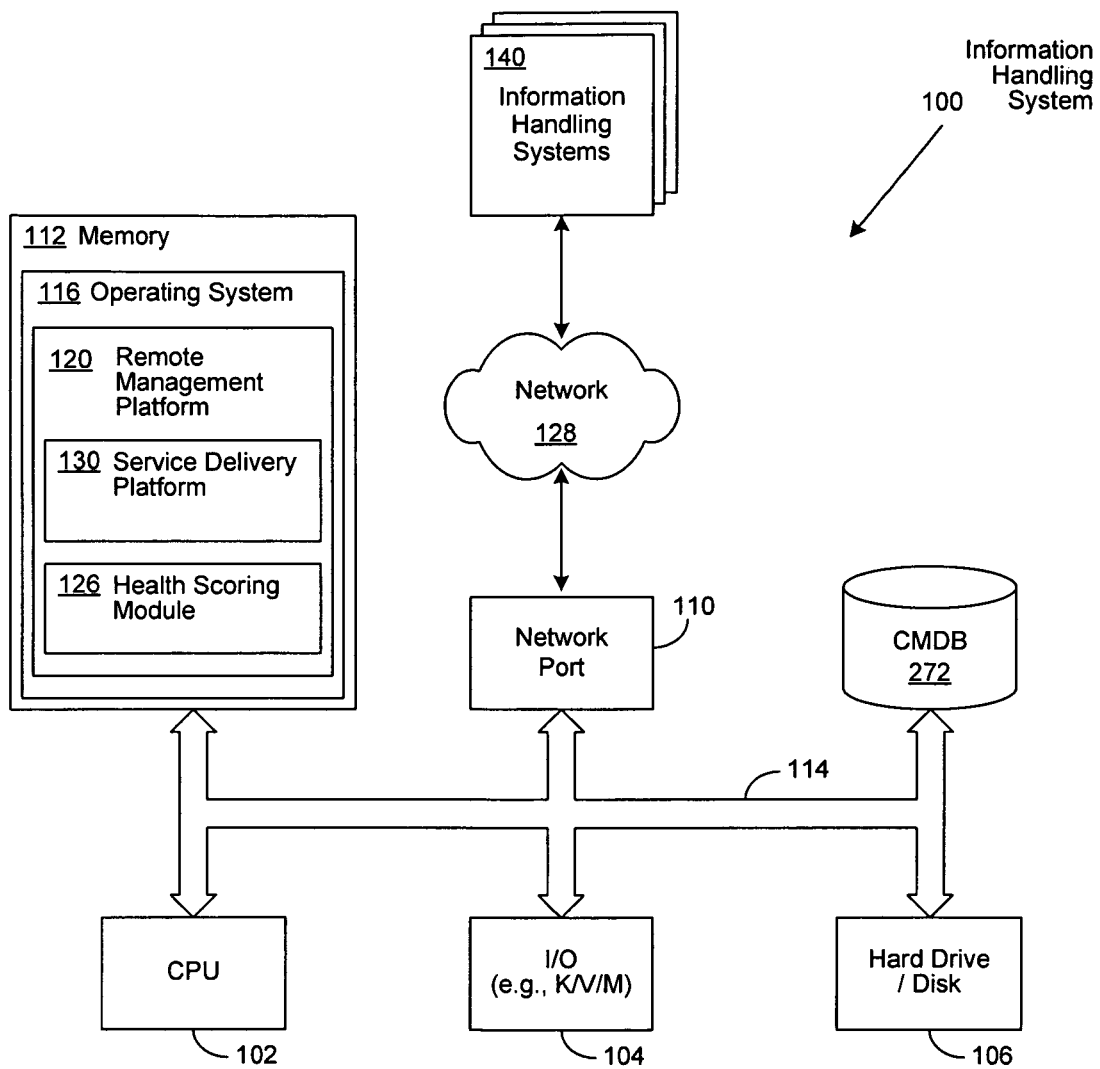
FIG. 1 is a general illustration of components of an information handling system as implemented in the system and method of the present invention.

FIG. 1 is a generalized illustration of an information handling system 100 that can be used to implement the method and system of the present invention. The information handling system 100 includes a processor (e.g., central processor unit or "CPU") 102, input/output (I/O) devices 104, such as a display, a keyboard, a mouse, and associated controllers, a hard drive or disk storage 106, various other subsystems, such as a configuration management database (CMDB) 272, network port 110 operable to connect to a network 128 to provide user access to a plurality of information handling systems 140, and system memory 112, all interconnected via one or more buses 114. System memory 112 further comprises operating system 116 and remote management platform 120, further comprising service delivery platform 130 and health scoring module 126.

Figure 2:
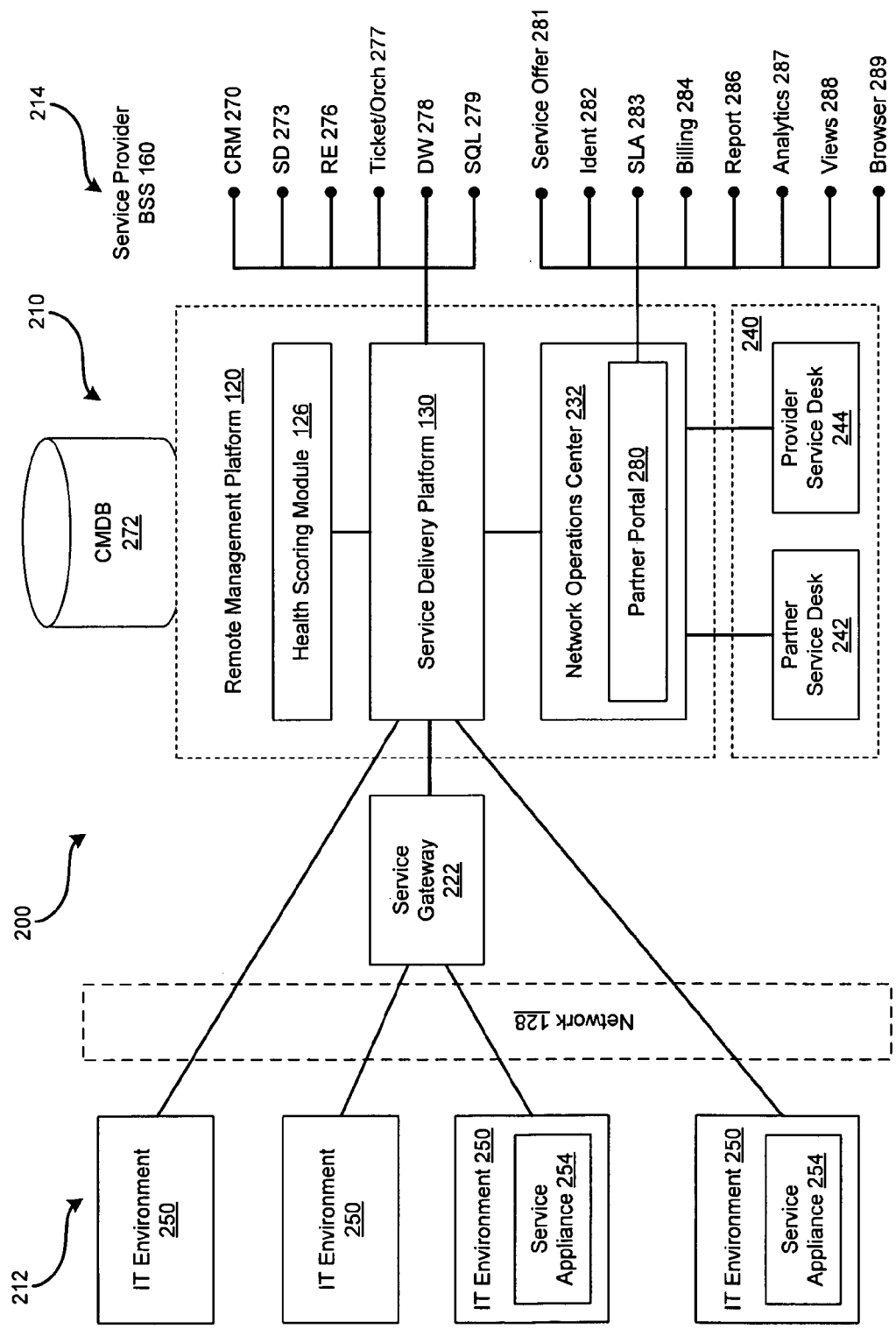
FIG. 2 is a simplified block diagram of a remote services management environment as implemented in accordance with an embodiment of the invention.

Referring to FIG. 2, a simplified block diagram illustrates a remote services management environment 200 as implemented in accordance with an embodiment of the invention. More specifically, the remote services management environment includes a service provider portion 210, a customer portion 212, and a business support system (BSS) (also referred to as a back end) portion 214. The service provider portion 210 includes a remote management platform 120 and may optionally include a service gateway 122. The remote management platform 120 includes a service delivery platform 130 and may optionally include a network operations center (NOC) 232. The network operations center 232 may be located in a different physical location from the service delivery platform (e.g., the network operations center 232 may be a global NOC). The service provider portion 220 may be coupled with a service desk operation 240, which may be a provider service desk operation 242, a partner service desk operation 244 or some combination of a provider service desk operation 242 or a partner service desk operation 244. The remote management platform 120 further comprises a service delivery platform 130 and a health scoring module 126. In various embodiments, the health scoring module 126 is operable to generate health scores for configuration items contained in a configuration management database (CMDB) 272 as described in greater detail herein.

The customer portion 212 may include one or more customer information technology (IT) environments 250. Each of the IT environments 250 may be agent type IT environments, agentless type IT environments or some combination of agent and agentless type IT environments operable to monitor components of the IT environments 250. As such, the associated status and configuration information can be provided to the service delivery platform 130. In turn, the service delivery platform 130 provides the associated status and configuration information to the health scoring module 126 to generate a health subscore for predetermined components of the IT environments 250. The customer portion 212 may be coupled to the service provider portion 210 via a network 128 such as the Internet. Alternately, for certain types of secure IT environments, the customer portion may be decoupled from the service provider portion 210. In this type of configuration, the secure IT environment might include a dedicated services appliance 254 which generates and stores service information to some form of computer readable media. As an example, the service gateway 222 might save service information to a CD ROM, which is analyzed by customer personnel prior to being provided to the service provider portion 210.

The business support system (BSS) portion 214 can include a service provider BSS 260 and/or a customer BSS. The service provider BSS 260 can be coupled to one or more of a plurality of back end systems such as a Centralized Resource Management (CRM) system 270, a configuration management database (CMDB) system 272, a Service Desk portion system 274, a global positioning system (GPS) module 275, a rules engine (RE) system 276, a ticketing or orchestration (such as e.g., ticketing or orchestration information which conform to standards set forth by the Organization for the Advancement of Structured Information Standards OASIS)), a data warehouse (DW) system 178 and/or a SQL system 279. The customer BSS can also be coupled to one or more of a plurality of back end systems.

In combination with the service gateway 222 and the service desk operation 240, the service delivery platform 130 can proactively generate service calls to a customer. For example, a services appliance might determine that a printer within a customer IT environment is running low on toner. The services appliance generates a message that is provided to the service delivery platform 130. This information is then provided to the health scoring module 126 and the network operations center 232, either via a push or pull message. The health scoring module 120 can then generate a health subscore for the printer, thereby denoting its operating health. As a result of a monitored health score being below its target value, the network operations center 232 can then generate a ticket for the service desk operation 240. Based upon the generation of the ticket, the service desk operation could send a service person to replace the toner cartridge of the printer at the customer IT environment.

In certain embodiments, the remote management platform 120 can include a partner portal 280 (which may for example be included within the network operations center 232). The partner portal 280 can provide a plurality of partner facing functions including a service offering function 281, identity functions 282, service level agreement (SLA) functionality 283, reporting functions 284, analytics functions 285, viewing functions 288, and browser functions 289. Additionally, the partner portal 280 can provide health subscores for individual components of IT environments 250, or health scores for predetermined subsets of an IT environment or associated process. In certain embodiments, the partner portal 280 can be a multi-tenant partner portal which provides multi-tenant services. The multi-tenant services can include mapping to a company hierarchy, including unique identifiers such as address, Tax ID, and Dun & Bradstreet DUNS number to index individual groupings, such as division and sits. This information can be combined into multiple company hierarchies at granular levels. Multi-tenant operations can be performed on any combination of hierarchy subtrees, nodes or roles within these. Companies can be customers, such as self service customers, or third party service providers such as retailers, value added resellers (VARs) or managed service providers.

Figure 3:
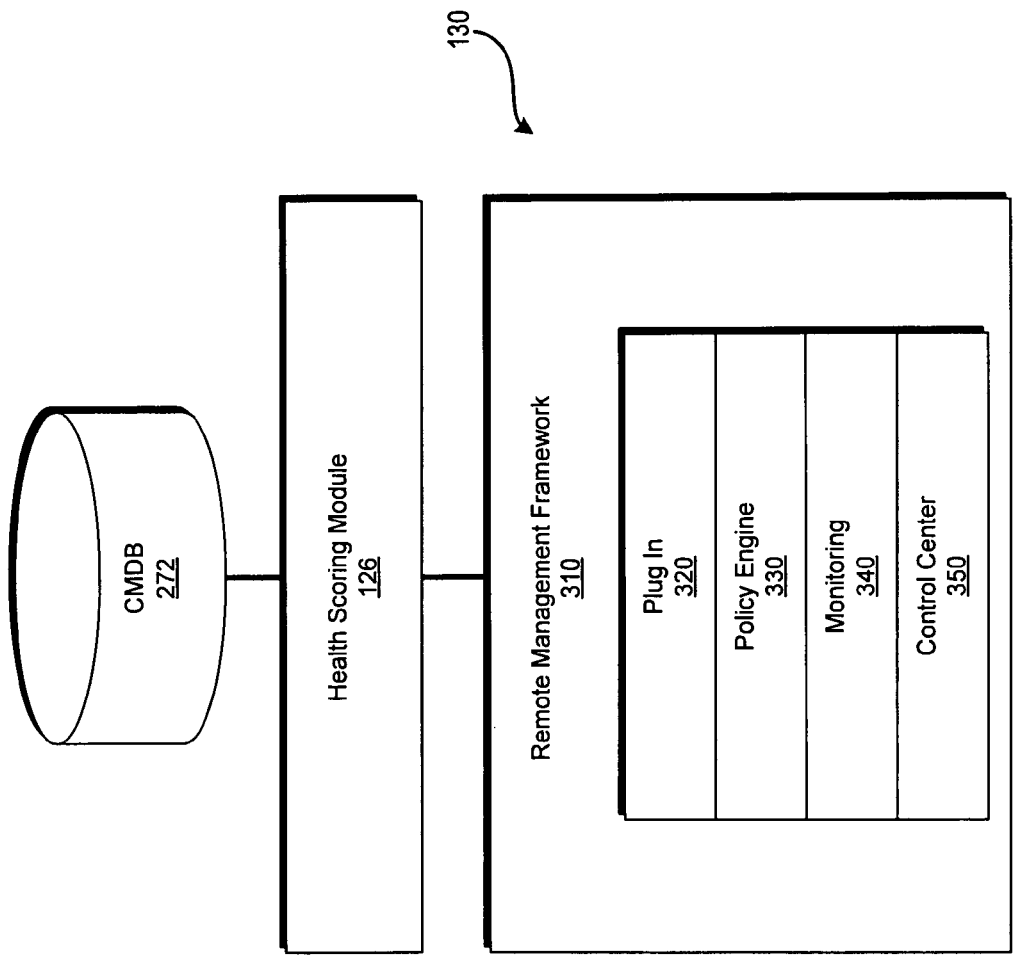
FIG. 3 is a simplified block diagram illustrating a remote services management platform as implemented in accordance with an embodiment of the invention.
Figure 5:
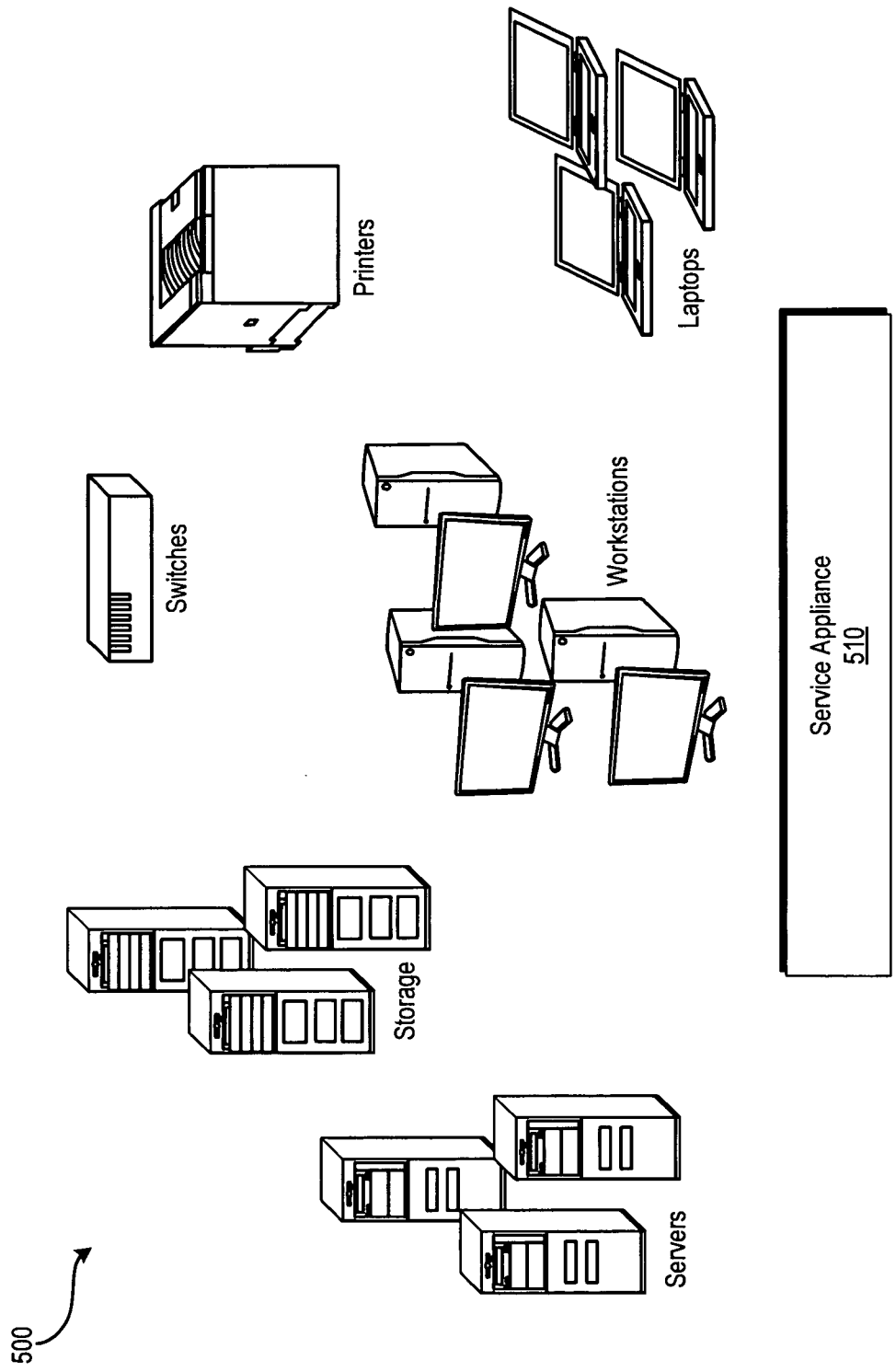
FIG. 5 is a simplified block diagram illustrating of an exemplary customer IT environment.

FIG. 3 is a simplified block diagram illustrating a remote services management platform 310 as implemented with a health scoring module 126 and a configuration management database (CMDB) 272 in accordance with an embodiment of the invention. More specifically, the service delivery platform 130 includes a remote management framework 310, as well as a plurality of service delivery platform modules. For example, the service delivery platform modules can include a plug-in module 320, a policy engine module 330, a monitoring module 340, and a control center 350.

The plug-in module 320 allows various applications or functions to be selectively enabled and executed within the remote management framework 210. The policy engine module 330 provides a policy administration function as well as intelligence on how to respond to service events. The policy engine module 330 can provide best action indications based upon service information as well as information provided via the back end portion 214. The monitoring module provides event level monitoring as well as license monitoring and contract clause level monitoring of an IT environment 250.

The control center 350 exposes a plurality of functions provided via the remote management platform. More specifically, the control center can deliver alerts based on platform events and data, the control center 350 can perform an analytics function which supports reporting and analysis across device data, financial data, and application data gathered from the applications integrated within the remote management framework. The control center can provide a user management function which allows administrators to maintain users in terms of roles, permissions, and a list of services a user is allowed to access. The control center 350 can provide a security function which supports security for sign on, user access, and message encryption. The control center 350 can provide a work flow function which provides work flow services to applications executing within the remote management platform 120.

The service delivery platform 130 uses a combination of web services and command line application program interfaces (APIs) to support the integration of software applications and other functional components to deliver management services and provide functionality to the IT environments 250. The service delivery platform 130 can use services device agents resident on devices within an IT environment or can use a service appliance that communicates with the devices within an IT environment.

Applications executing within the service delivery platform 130 may be delivered via an on-demand model as part of the remote management platform or may be provided via a third party service offering. The service delivery platform 130, through the use of the plug-in module 320, optionally and selectively supports service offerings such as asset management, virus protection, patch management, software distribution, and on-line backup. The service delivery platform 130, through the use of the policy engine module 330 and the monitoring module 340, also supports permissions management as well as service entitlement management functions, both of which can be provided via partners or independent software vendors who are making use of the remote management platform 120. Permissions management allows user access to applications executing on the platform to be managed according to user specific roles and permissions associated with those roles. Service entitle management allows applications executing on the platform to deliver functionality based upon varying levels of service set by a customer or partner at the service portal 280.

The IT environment 250 can make use of service device agents. The service device agents may be deployed on devices within the IT environment 250. The service device agents can provide a direct connection (e.g., via the network 128) to the remote management platform 120. The service device agents can execute either generic services or application specific services provided via the applications executing within the plug-in module 320. The service device agents and the service appliance 254 provide an extensible mechanism for software download, inventory gathering, logging, diagnostics, and monitoring. The operations are accessible via a command line, API or Web Service (such as web services corresponding to standards set by the Web Services Interoperability Organization (WS-I)) on the agent or appliance and can be used by integration developers for integrating additional remote services functions. The information collected via the service device agents or the service appliance integrates via the remote management platform 120 and is accessible to applications executing on the service delivery platform 130, such as the health scoring module 126. In various embodiments, this collected information is used by the health scoring module 126 to generate a health subscore for configuration items stored in CMDB 272 that correspond to components within IT environments 250.

The service delivery platform 130 can include a plurality of APIs. For example, the service delivery platform 130 can include user synchronization APIs which allow a service provider (or third party using the framework) to synchronize information with the management framework 310. The service delivery platform 130 can also include a data retrieval APIs which allow a service provider (or third party using the framework) to extract data from the service delivery platform 130.

Thus, the service delivery platform 130 can include customer facing APIs which enable integration of existing data regarding users, software licenses, applications and other information that may be used by an application executing within the service delivery platform. The service delivery platform can also include partner facing APIs which enable partner service providers to link existing solutions, such as customer relationship management or service management, with the service delivery platform. These partner-facing APIs thus enable a partner using the service delivery platform to deliver value added solutions on top of the service delivery platform, thus facilitating multi-tier use of the service delivery platform.

The service delivery platform 130 of the remote services management environment 200 enables the provision of remote services to customers at a service level agreement (SLA) level. I.e., a plurality of services may be provided to the customer where each of the services corresponds to a clause within a service level agreement. Additionally, the remote management platform 120 enables and empowers a multi tier provision of remote services. With a multi tier provision of remote services, original equipment manufacturer (OEM) service providers or third party service providers can make use of the remote management platform 120 to provide services to a customer where the actual location of the underlying remote management platform 120 is transparent to the customer.

Additionally, the remote management platform 120 enables remote services to be provided using a software as a service (SaaS) business model, which thus effectively becomes providing information technology as a service (ITaaS). Using this model, a customer might only be charged for the remote services that are actually used. (This charge might be monitored e.g., via the monitoring module 340.) The actual supply chain for the revenue generation is via the remote management platform 120. The combination of the monitoring module 340 and the control center 350 facilitates reporting and billing of the services provided by the remote management platform. Remote services provided via the SaaS model may also include other billing options such as subscription, pricing, flexible promotions and marketing, invoicing, financial management, payments, collections, partner relations, revenue analysis, and reporting. With zero or more subscriptions, balances, bills and payments per account, ITaaS pricing can include one-time, recurring, usage, or any event updatable payment method, flexibly based on tier, volume, time, zone attribute or customer. Bundling can include multi-service offerings, up-sell, cross-sell, discounts and promotions. Bundling can integrate a service offering registry 281 with a service catalog management UI per tenant and tier to define a pricing scheme per event type, exclusion rules and dependencies, can create bundled offerings and manage price data or changes to any of these features. Balance management can include real-time threshold notification and balance updates. Service level balances may be provided with separate bills, credit limit monitoring, resource definition, management, and reservation with prepaid IT services. Multi-payment convergent accounts may be provided on a consolidated platform. A single partner or provider can view multiple balances, support sub-balances with validity dates. A service level can be balanced with separate bills and payment methods. Flexible promotions and rapid provider configuration enable marketing which can include quick response to a changing market and competitive purchase and upgrade incentives as well as select and group based promotions and volume and cross service discounts. It will be apparent to those of skill in the art that each of these typically has a corresponding configuration item residing in the CMDB 272.

Referring to FIGS. 4a-b, referred to herein collectively as FIG. 4, are a simplified block diagram of a plug-in module 320 of a service delivery platform 130 as implemented in accordance with an embodiment of the invention. The plug-in module 320 includes a plug-in base portion 406 which can optionally include any combination of a plurality of plug-in functions. The plug-in base module 406 can control which of the plurality of plug-in functions to which a particular remote service customer might have access. Additionally, the plug-in base module 406 interacts with the monitoring module 340 to enable a remoter services provider to track and bill for each of the enabled plug-in functions.

In certain embodiments, the plug-in functions can include one or more of a base function 410, an asset discovery function 412, an asset management function 414, a software distribution function 416, a software license management function 418, a patch management function 420, an anti-malware management function 422, an online backup function 424, a remote support function 426, a remote access function 428, a data encryption function 430, and a connector API function 432. By providing these functions within the plug-in module, it is possible to allow a service provider to easily add or remove functionality to the remote services that are being provided to a particular customer via the service delivery platform.

Each of the plurality of plug-in functions can include one or more plug-in applications or application-like service independent building blocks (SIBB). For example, the base function can include a hardware inventory application, a site creation application, a bandwidth policy application, a send message to device application, a user management application, an advanced search application, a dashboard application, a data export application, a remote deployment application, a web services application, an alerts and notifications application and a localization application. The various applications may be different brands of applications, different applications within a brand or different versions within the application. The SIBB plug-in functions can include subparts of applications, which may include separate service offerings as well as additional extensible markup language (XML) document type definitions (DTDs) or schema and their integrations.

By providing these functions within the plug-in module 320 it is possible for a service provider to easily change a type of application for each of the functions. As an example, a customer might desire changing from a first brand or version of anti virus software application to another brand or version of anti virus software application, or more than one type of application (e.g., for multiple customer sites, for legacy applications or for acquisitions within the customer IT environment). As will likewise be appreciated by those of skill in the art, each of these will generally have a corresponding configuration item stored in the CMDB 272. As such, the health scoring module 126 is operable in various embodiments to generate a health subscore for each, and by extension, a health score for a predetermined target group of corresponding configuration items.

FIGS. 5-8 show examples of a plurality of customer IT environments that are included within a remote services management environment. For example, referring to FIG. 5, an example customer IT environment 400 can include a plurality of information handling system devices such as laptops, workstations, servers, storage devices, switches, and printers. The devices can include their primary operating system (an in-band operating system) as well as a secondary operating system (an out of band operating system) such as a real time operating system, a service processor or a controller. The example customer IT environment 500 also includes a service appliance 510. The service appliance 510 is located within the firewall that protects and separates the customer IT environment 500 from devices external to the customer IT environment 500. The service appliance 510 provides a desktop management function to the customer IT environment and interacts with the remote management platform 120. The service appliance 510 enables service provision across the entire IT environment 500. The service appliance, in combination with the remote management platform, enables generation of reports on proactive service solutions as well as uncovering of new service opportunities.

The service appliance 510 allows agent-less discovery and management of the devices within the IT environment. When performing agent-less discovery, the service appliance 510 accesses all devices and applications of the IT environment 500. By using agent-less discovery, there is no need to deploy agents on every monitored device and all of the agent-less devices may be managed via the service appliance 510. It will be apparent to those of skill in the art that the information provided by each of these can be used by the health scoring module 272 in various embodiments to generate a one or more corresponding health subscores.

Figure 6:
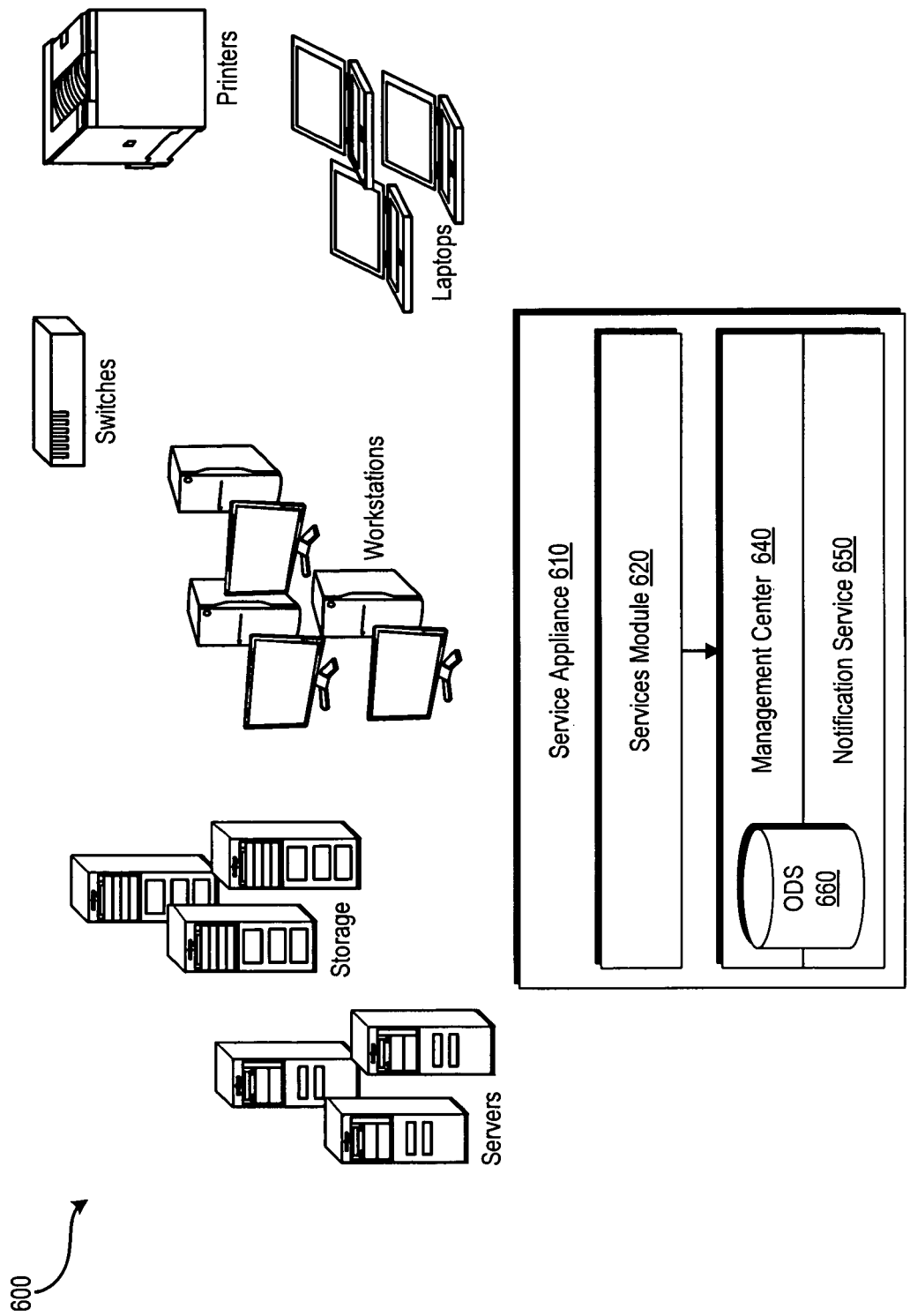
FIG. 6 is a simplified block diagram illustrating of another exemplary customer IT environment.

Referring to FIG. 6, another example customer IT environment 600 can include a plurality of information handling system devices such as laptops, workstations, servers, storage devices, switches and printers. The example customer IT environment 600 also includes a service appliance 610 as well as one or more devices which include an information handling system services module 620 (e.g., a service device agent). The service appliance 610 is located within the firewall that protects and separates the customer IT environment 600 from devices external to the customer IT environment 600. The service appliance 610 provides a desktop management function to the customer IT environment and interacts with the remote management platform 120. The service appliance 610 enables service provision across the entire IT environment 600. The service appliance, in combination with the remote management platform 120, enables generation of reports on proactive service solutions as well as uncovering of new service opportunities.

The service appliance 610 allows agent based, agent-less or hybrid discovery and management of the devices within the IT environment. When using agent based discovery and management, the service appliance 610 interacts with an information handling system services module 620 (e.g., a service device agent) which is loaded on some or all of the devices. The information handling system services module includes a small-footprint, client application that enables information handling systems to be monitored by the service appliance 610. In certain embodiments, the information handling system services module can execute as a Windows Service on the information handling system client.

Alternately, when performing agent-less discovery, the service appliance accesses devices and applications of the IT environment 600. By using agent-less discovery, there is no need to deploy agents on every monitored device, and all of the agent-less devices may be managed via the service appliance 600, such as accessing existing windows services via a simple network management protocol (SNMP), a Windows type remote procedure call (RPC) or a Windows management instrumentation (WMI) type API with local access or directory domain security token such as from either a network operating system security (such as an Active Directory or eDirectory) or from a full Directory Service such as security assertion markup language (SAML) directory service.

The service appliance 610 includes a management center 640 as well as a notification server 650. The management center module 640 and the notification server 650 interact with an operational data store (ODS) 660. The operation data store 660 provides a database for queries on transactional data. The operational data store 660 provides a staging area for data that is provided to the data warehouse 260 of the back end 214. However, the contents of the operational data store 660 are updated with information from the customer IT environment 600. It will likewise be apparent to those of skill in the art that the information provided by each of these can be used by the health scoring module 272 in various embodiments to generate a one or more corresponding health subscores.

Figure 7:
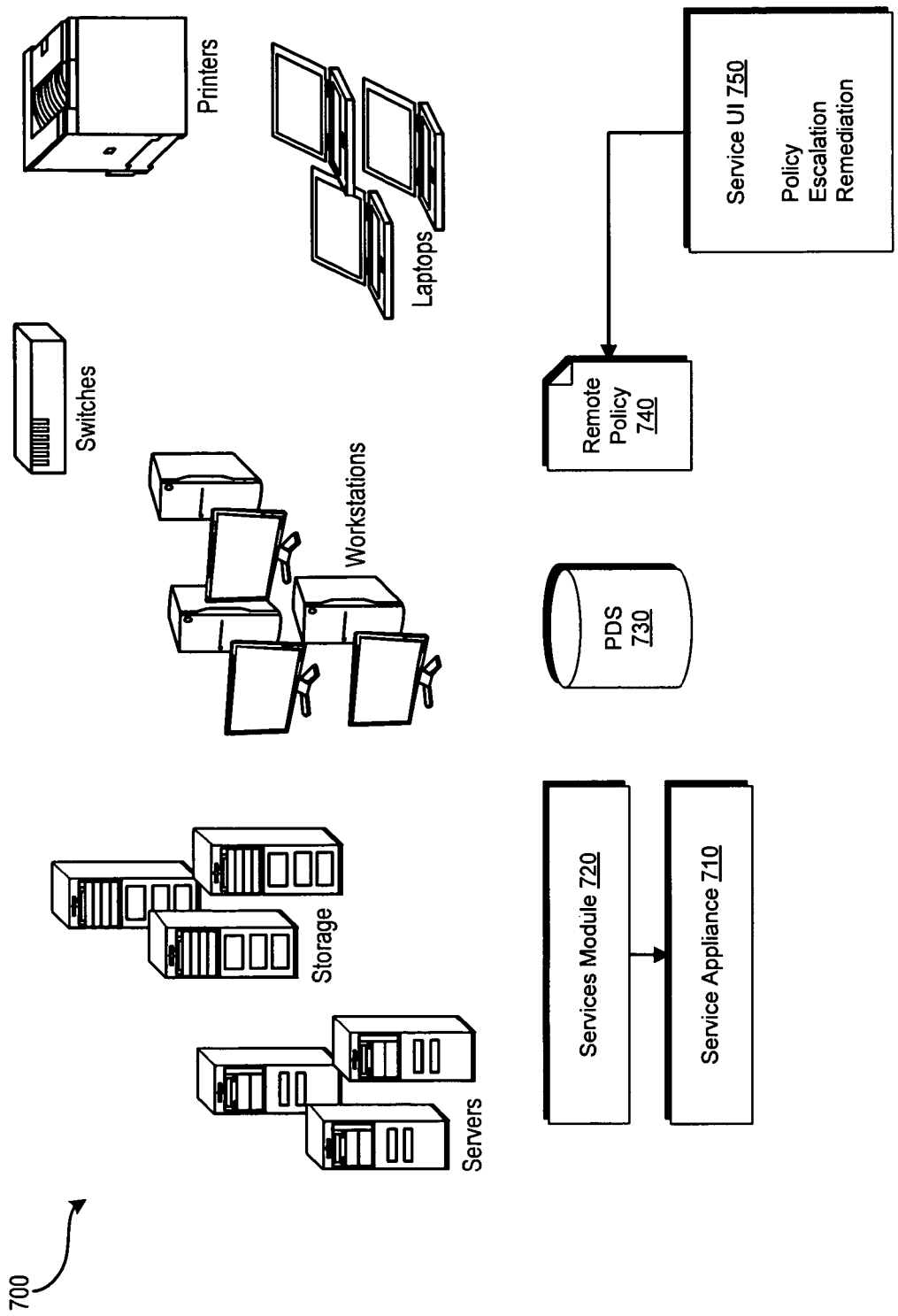
FIG. 7 is a simplified block diagram illustrating of another exemplary customer IT environment.

Referring to FIG. 7, another example customer IT environment 700 can include a plurality of information handling system devices such as laptops, workstations, servers, storage devices, switches and printers. The example customer IT environment 700 also includes a service appliance 710 as well as one or more devices which include an information handling system services module 720 (e.g., a service device agent). The service appliance 710 is located within the firewall that protects and separates the customer IT environment 700 from devices external to the customer IT environment 700. The service appliance 710 provides a desktop management function to the customer IT environment and interacts with the remote management platform 120. The service appliance 710 enables service provision across the entire IT environment 700. The service appliance, in combination with the remote management platform 120, enables generation of reports on proactive service solutions as well as uncovering of new service opportunities.

The service appliance 710 allows agent based, agent-less or hybrid discovery and management of the devices within the IT environment. When using agent based discovery and management, the service appliance 710 interacts with an information handling system services module 720 which is loaded on some or all of the devices. The information handling system services module includes a small-footprint, client application that enables information handling systems to be monitored by the service appliance 710. In certain embodiments, the information handling system services module can execute as a Windows Service on the information handling system client.

Alternately, when performing agent-less discovery, the service appliance 710 accesses devices and applications of the IT environment 700. By using agent-less discovery, there is no need to deploy agents on every monitored device and all of the agent-less devices may be managed via the service appliance 710.

The IT environment 700 also includes a persistent data store (PDS) 730 as well as a remote policy module 740. The persistent data store 730 allows storage of persistent service data within the IT environment 700. This persistent data can include customer specific data as well as data provided via the back end portion 214. The persistent data can be used with the remote policy module 740 to provide recommendations to a customer regarding service opportunities or optimizations. The remote policy module 740 may include a subset of a global policy that is specific to the particular customer. The remote policy module 740 can include resource manifest information, preference information and contracted service offerings that are specific to the particular customer.

The remote policy module 740 interacts with the remote management platform 120 via a service user interface 750. The service user interface 750 enables interaction with a plurality of functions of the remote management platform 120. For example, the service user interface enables interaction with a policy function, an escalation function and a mediation function. The service user interface 750 can include a subset of the partner portal 280 which is specific to the particular customer. It will be apparent that the information provided by each of these can be used by the health scoring module 272 in various embodiments to generate a one or more corresponding health subscores.

Figure 8:
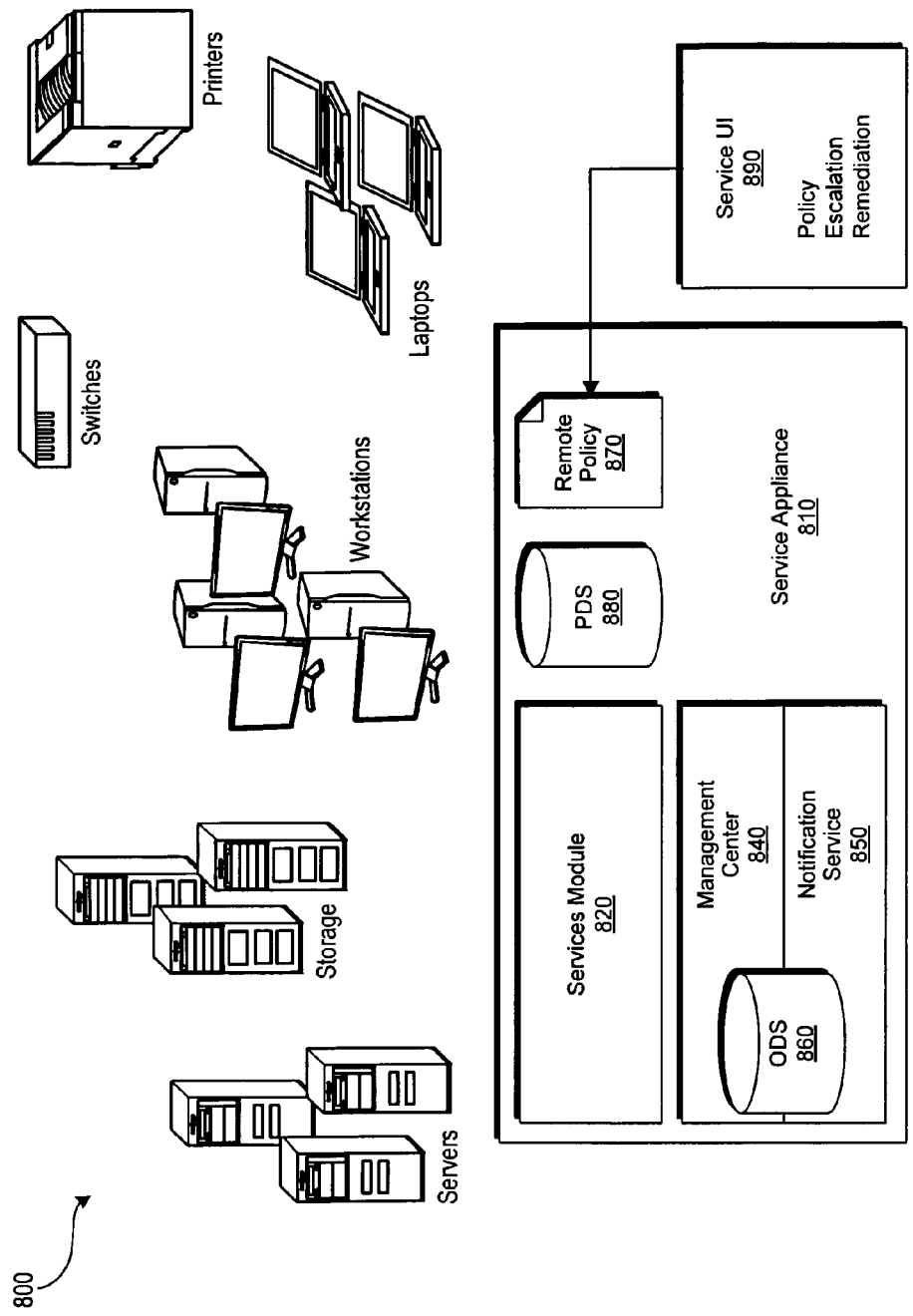
FIG. 8 is a simplified block diagram illustrating of another exemplary customer IT environment.

Referring to FIG. 8, another example customer IT environment 800 can include a plurality of information handling system devices such as laptops, workstations, servers, storage devices, switches and printers. The example customer IT environment 800 also includes a service appliance 810 as well as one or more devices which include an information handling system services module 820 (e.g., a services agent). The service appliance 810 is located within the firewall that protects and separates the customer IT environment 800 from devices external to the customer IT environment 800. The service appliance 810 provides a desktop management function to the customer IT environment and interacts with the remote management platform 120. The service appliance 810 enables service provision across the entire IT environment 800. The service appliance, in combination with the remote management platform 120, enables generation of reports on proactive service solutions as well as uncovering of new service opportunities.

The service appliance 810 allows agent based, agent-less or hybrid discovery and management of the devices within the IT environment. When using agent based discovery and management, the service appliance 810 interacts with an information handling system services module 820 which is loaded on some or all of the devices. The information handling system services module includes a small-footprint, client application that enables information handling systems to be monitored by the service appliance 810. In certain embodiments, the information handling system services module can execute as a Windows Service on the information handling system client.

Alternately, when performing agent-less discovery, the service appliance accesses devices and applications of the IT environment 800. By using agent-less discovery, there is no need to deploy agents on every monitored device and all of the agent-less devices may be managed via the service appliance 800.

The service appliance 810 includes a management center 840 as well as a notification server 750. The management center module 840 and the notification server 850 interact with an operational data store (ODS) 860. The operation data store 860 provides a database for queries on transactional data. The operational data store 860 provides a staging area for data that is provided to the data warehouse 260 of the back end 214. However, the contents of the operational data store are updated with information from the customer IT environment 800.

The service appliance also includes a persistent data store (PDS) 870 as well as a remote policy module 880. The remote policy module 880 interacts with the remote management platform 120 via a service user interface 890. The service user interface 890 enables interaction with a plurality of functions of the remote management platform 120. For example, the service user interface enables interaction with a policy function, an escalation function and a mediation function. It will likewise be appreciated by skilled practitioners of the art that the information provided by each of these can be used by the health scoring module 272 in various embodiments to generate a one or more corresponding health subscores.

Figure 9A:
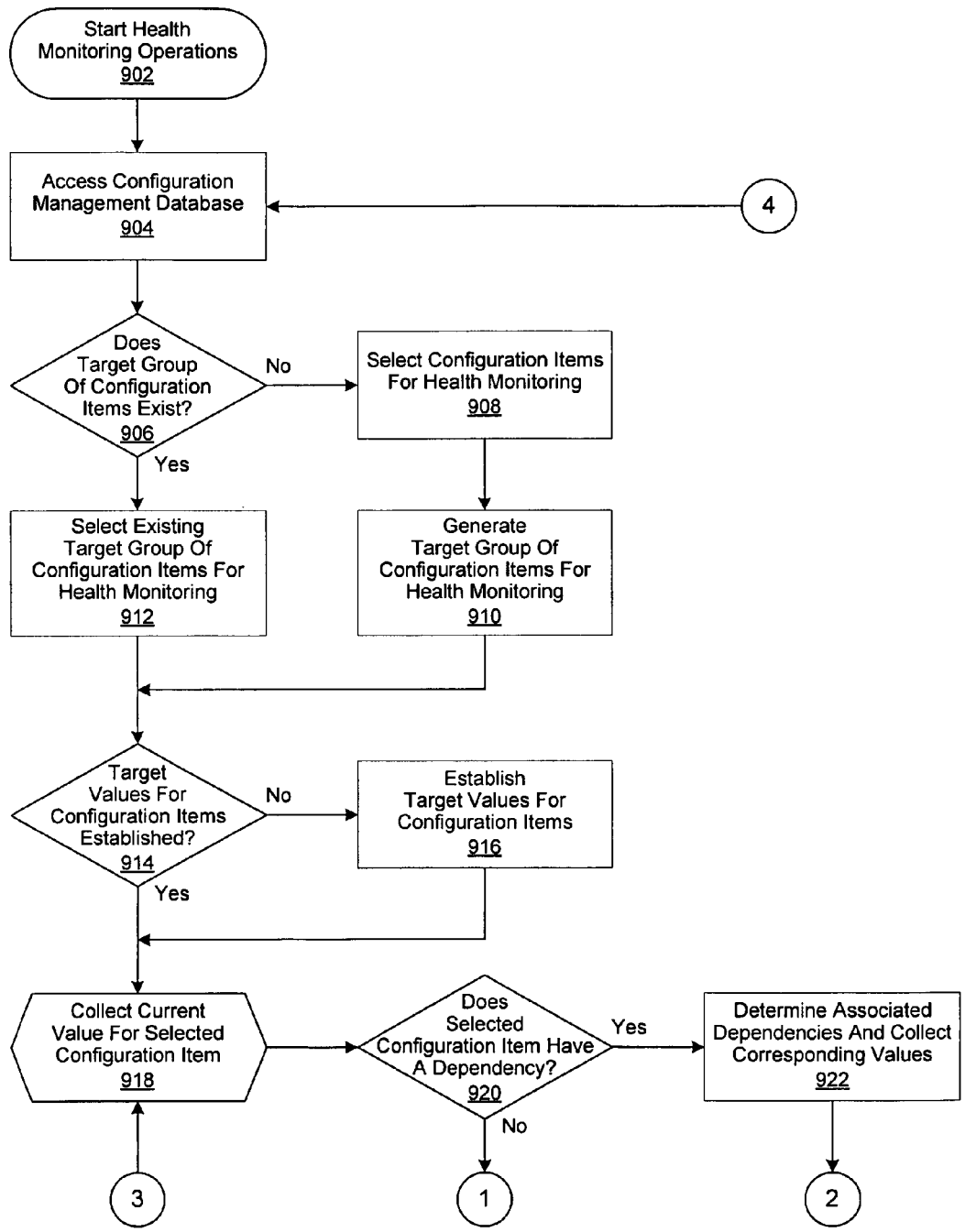
FIGS. 9a-b are a generalized flowchart of the operation of a health scoring module as implemented in accordance with an embodiment of the invention.
Figure 9B:
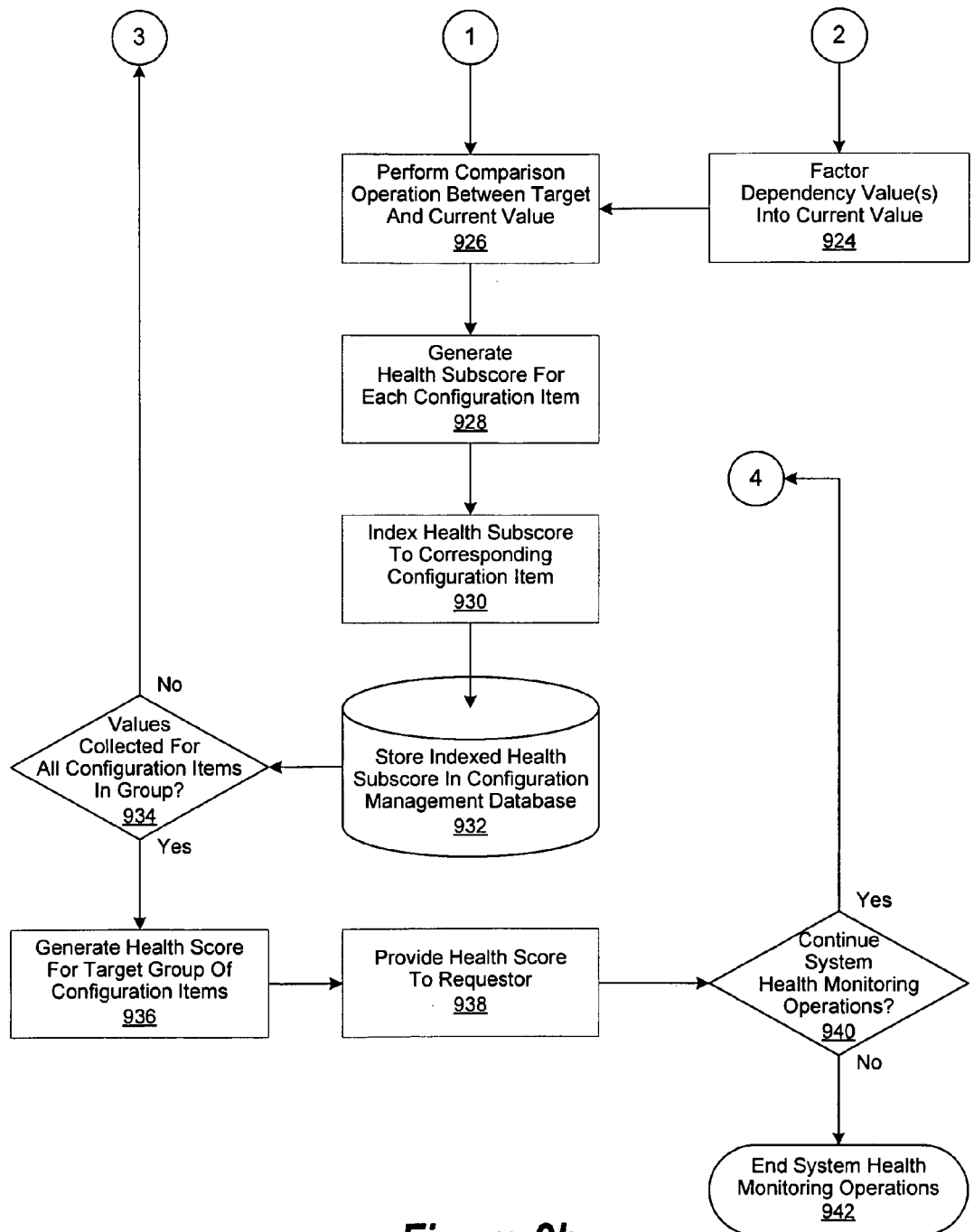

FIGS. 9a-b are a flowchart illustrating the operation of a health scoring module as implemented in accordance with an embodiment of the invention. In this embodiment, health monitoring operations of an information technology (IT) environment, as described in greater detail herein, is started in step 902 with the initiation of a health scoring module. In step 904 a configuration management database (CMDB), comprising a plurality of configuration items, is accessed.

Configuration items may be identifiers of a configuration for the IHS 100. In an embodiment, a configuration item may be hardware and/or hardware revision information for the IHS 100. In an embodiment, a configuration item may be software and/or software revision information for the IHS 100. By knowing the configuration items for an IHS 100, the operation of the IHS 100 may be more easily understood or diagnosed. A CMDB tracks and records configuration items for an IHS 100 and details about attributes and relationships between the configuration items. The CMBD may automatically or manually track information about the configuration items. In an embodiment, a CMDB is a repository of information related to the components of an IHS 100. In an embodiment, a CMDB is the implementation of a database that contains details about the organization's information technology (IT) services. Being more than an asset register, of the hardware and software for an organization's IHS 100s, a CMDB may contain information that relates to the maintenance, movement, and problems experienced with the configuration items of the IHS 100s. Information held by a CMDB may range from hardware information, software information, documentation information, personnel information, and/or a variety of other information. A CMDB may have tasks to perform for maintaining information about the IHS 100s. For example, the tasks may relate to identification of IHS 100 components and their inclusion in the CMDB, control and management of configuration items and specifying who is authorized to modify it, recording and maintaining status information of the configuration items, and verification such as, review and audit of information to ensure accuracy of the information in the CMDB.

In step 906, a decision is made whether a target group of configuration items has been previously defined. If not, then configurations items are selected for health monitoring in step 908. A target group comprising the selected configuration items is then generated in step 910. In one embodiment, the target group comprises all configuration items in the CMDB. In another embodiment, the target group comprises configuration items in a predetermined domain. In yet another embodiment, the target group comprises configuration items associated with a process. Such processes include a service desk, incident management, problem management, change management, configuration management, release management, or service level management. Other such processes include financial management for IT services, capacity management, availability management, and IT service continuity management. In another embodiment, the target group of configuration items may be a list of a number of IHS 100 configuration items having similar configuration items to an IHS 100 at hand.

However, if it is decided in step 906 that the target group of configuration items currently exists in step 906, then it is selected in step 912. Once the target group of configuration items is generated in step 910 or selected in step 912, a decision is made in step 914 whether target values have been established for the configuration items in the generated or selected target group. If not, then a target value is established in step 916 for each of the configuration items in the target group.

The current value for a selected configuration item in the target group is then collected, as described in greater detail herein, in step 918. As the current value for the selected configuration item is collected, a decision is made in step 920 whether the selected configuration item has a dependency. In one embodiment, the dependency is physical. As an example, the configuration item may be virtualized or partitioned. As another example, the selected configuration item may be associated with a related configuration item or a configuration item that has been hardened through the closure of ports, disabling of protocols, etc. In another embodiment, the dependency is a service dependency comprising service information such as that generated by a user, a service desk system, a Computer Aided Software Engineering (CASE) system, or a data warehouse. In yet another embodiment, the dependency is a business dependency, such as a user, a workflow, a business process flow, or a contractual agreement.

If it is decided in step 920 that a selected configuration item has a dependency, then the associated dependencies are determined in step 922 and their corresponding current values are collected. The corresponding current values are then factored into the current value of the selected configuration item in step 924. If it is decided in step 920 that the selected configuration item has no dependencies, then its current value, or its current value including values factored-in from dependencies in step 924, is compared to its corresponding target value in the CMDB. As a result of the comparison operation, a health subscore is generated for the selected configuration item in step 928. The health subscore is then indexed to the selected configuration item in step 930 and stored in the CMDB in step 932. A decision is then made in step 934 whether the current value has been collected for all configuration items in the target group. If not, the process continues, proceeding with step 918. Otherwise, a health score is generated in step 936 for the target group of configuration items. The resulting health score is then provided to the requestor in step 938. In one embodiment, the health score is presented to a user through the user interface (UI) of a remote management platform. In another embodiment, the health score is presented to a user through the user interface (UI) of a user portal. In yet another embodiment, the health score is presented to a service delivery platform of a remote management platform. A decision is then made in step 940 whether system health monitoring operations are to be continued. If so, the process is repeated, proceeding with step 904. Otherwise, system health monitoring operations are ended in step 942.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. Consequently, the invention is intended to be limited only by the spirit and scope of the appended claims, giving full cognizance to equivalents in all respects.

What is claimed is:

1. A computer-implementable method for monitoring the status of a system, comprising:
   accessing a configuration management database comprising a plurality of configuration items and information regarding relationships of a configuration item with other configuration items;
   determining whether a target group of configuration items has been previously defined;
      when the target group has not been previously defined, then selecting configuration items for health monitoring and generating a target group comprising selected configuration items;
      when the target group has been defined, then selecting a defined target group;
   determining whether target values have been established for the configuration items in the target group;
      when target values have not been established, then establishing target values for the configuration items;
   collecting a current value for a selected configuration item;
   determining whether the selected configuration item has a dependency;
   determining associated dependencies and collecting corresponding dependency values when the configuration item has a dependency and factoring the corresponding dependency values into the current value for the selected configuration item;
   performing a comparison operation between the target value and the current value;
   generating a health subscore value from the comparison operation;
   indexing the health subscore value to the configuration item;
   generating a health subscore value for each of a plurality of the configuration items to provide a plurality of health subscore values;
   providing health subscores for the configuration item via a partner portal, the plurality of health subscore values comprising the health subscores for the configuration item provided via the partner portal;
   providing health subscores for sets of configuration items via the partner portal, the plurality of health subscore values comprising the health subscores for the sets of configuration items provided via the partner portal;
   indexing the plurality of health subscore values to provide indexed health subscore values;
   generating a health score value, the health score value being based upon the indexed health subscore values; and,
   determining whether to generate a service request for the system based upon the health score value.

2. The method of claim 1, wherein said configuration item is mapped to a physical object and said information is received from said physical object using a protocol comprising one of:
   Common Information Model (CIM);
   Windows Management Instrumentation (WMI);
   Remote Procedure Call (RPC); and
   Simple Network Management Protocol (SNMP).

3. The method of claim 1, wherein said configuration item has a dependency, wherein:
   synchronizing said configuration item generates an updated health subscore for said configuration item; and wherein
   said dependency comprises at least one of:
      a physical dependency;
      a service dependency; and
      a business dependency.

4. The method of claim 3, wherein said physical dependency comprises at least one of:
   a virtualized configuration item;
   a partitioned configuration item;
   an associated configuration item; and
   a hardened configuration item.

* * * * *